(12) United States Patent
Coomes et al.

(10) Patent No.: US 11,651,519 B2
(45) Date of Patent: May 16, 2023

(54) AUTONOMOUS 2D DATACENTER RACK IMAGER

(71) Applicant: Google LLC, Mountain View, CA (US)

(72) Inventors: Christopher James Coomes, Bothell, WA (US); John Zevenbergen, Woodway, WA (US); Nivedita Ravi, Seattle, WA (US); Joseph Reichenbach, Snoqualmie, WA (US)

(73) Assignee: Google LLC, Mountain View, CA (US)

( * ) Notice: Subject to any disclaimer, the term of this patent is extended or adjusted under 35 U.S.C. 154(b) by 221 days.

(21) Appl. No.: 17/036,787

(22) Filed: Sep. 29, 2020

(65) Prior Publication Data

US 2022/0051442 A1 Feb. 17, 2022

Related U.S. Application Data (60) Provisional application No. 63/064,652, filed on Aug. 12, 2020.

(51) Int. Cl.
*G06T 7/00* (2017.01)
*G06T 3/40* (2006.01)

(52) U.S. Cl.
CPC .............. *G06T 7/97* (2017.01); *G06T 3/4038* (2013.01); *G06T 2207/30164* (2013.01); *G06T 2207/30252* (2013.01)

(58) Field of Classification Search
CPC ................... G06T 7/97; G06T 3/4038; G06T 2207/30164; G06T 2207/30252
(Continued)

(56) References Cited

U.S. PATENT DOCUMENTS

2015/0363758 A1 12/2015 Wu et al.
2017/0032311 A1 2/2017 Rizzolo et al.
(Continued)

FOREIGN PATENT DOCUMENTS

CN 203872277 U 10/2014
CN 206433091 U 8/2017
(Continued)

OTHER PUBLICATIONS

Notification of First Office Action for Chinese Patent Application No. 202110044006.9 dated Jan. 11, 2022. 8 pages.
(Continued)

*Primary Examiner* — Ayodeji O Ayotunde
(74) *Attorney, Agent, or Firm* — Lerner David LLP (57) ABSTRACT

An automated rack imaging system is provided, including an automated guided vehicle having a housing and a propulsion system configured to move the housing. The automated rack imaging system may include an imaging system coupled to the housing. The imaging system may include a plurality of cameras. The cameras each may be configured to have a respective field of view. The fields of view may be at least partially non-overlapping with one another. The automated rack imaging system may also include an image processor configured to combine a plurality of images taken by the cameras into a single mosaic image. A method of imaging a datacenter rack with the automated guided vehicle is also provided. The method may include moving the automated guided vehicle to a first target location aligned with the datacenter rack, taking the plurality of images, and combining the plurality of images into the single mosaic image.

16 Claims, 6 Drawing Sheets

(58) Field of Classification Search
USPC .......................................................... 382/154
See application file for complete search history.

(56) References Cited

U.S. PATENT DOCUMENTS

2017/0286901 A1* 10/2017 Skaff .................. H04N 5/23238
2021/0118093 A1*  4/2021 Baijal .................... G06N 3/084

FOREIGN PATENT DOCUMENTS

| CN | 206561409 U   | 10/2017 |
|----|---------------|---------|
| JP | 2004070475 A  | 3/2004  |
| WO | 2017117686 A1 | 7/2017  |
| WO | 2019148060 A1 | 8/2019  |

OTHER PUBLICATIONS

Extended European Search Report for European Patent Application No. 21156854.8 dated Apr. 29, 2021. 7 pages.
Third Office Action for Chinese Patent Application No. 202110044006.9 dated Sep. 9, 2022. 6 pages.
Second Office Action for Chinese Patent Application No. 202110044006.9 dated Jun. 16, 2022. 7 pages.
Decision of Rejection for Chinese Patent Application No. 202110044006.9 dated Jan. 19, 2023. 5 pages.

* cited by examiner

AUTONOMOUS 2D DATACENTER RACK IMAGER

CROSS-REFERENCE TO RELATED APPLICATIONS

The present application claims the benefit of the filing date of U.S. Provisional Patent Application No. 63/064,652 filed Aug. 12, 2020, the disclosure of which is hereby incorporated herein by reference.

BACKGROUND

The state of datacenter rack contents is theorized based on various tools and processes, but the knowledge of the rack contents is not always entirely accurate. Conventional tools may store the state of datacenter rack contents using information that is manually entered, based on barcode asset tag information. However, if such rack content information is incorrect or only partially accurate, there may not be an easy way to correct such inaccuracies.

BRIEF SUMMARY

The present disclosure provides for automated rack imaging systems and methods of imaging a datacenter rack with an automated guided vehicle, using an imaging system comprising a plurality of cameras and an image process configured to combine a plurality of images into a single mosaic image.

One aspect of the disclosure provides an automated rack imaging system. The automated rack imaging system may include an automated guided vehicle having a housing and a propulsion system configured to move the housing. The automated rack imaging system may also include an imaging system coupled to the housing. The imaging system may include a plurality of cameras. The cameras each may be configured to have a respective field of view. The fields of view may be at least partially non-overlapping with one another. The automated rack imaging system may also include an image processor configured to combine a plurality of images taken by the cameras into a single mosaic image.

The cameras may be arranged in an array extending in a horizontal direction. The array may be moveable relative to the housing in a vertical direction perpendicular to the horizontal direction. The cameras in the array may be equally spaced apart from one another in the horizontal direction. The plurality of images may include a first set of the images taken at a first vertical position and a second set of the images taken at a second vertical position. The first vertical position and the second vertical position may be spaced apart from one another in the vertical direction. The imaging system may include a fixture affixed to the housing. The fixture may have a rail extending in the vertical direction and a carriage extending in the horizontal direction. The cameras may be affixed to the carriage. The carriage may be coupled to the rail such that the carriage is moveable relative to the rail in the vertical direction.

The imaging system may include a servo motor configured to move the carriage in the vertical direction along the rail. The plurality of images may be images of portions of a datacenter rack. The single mosaic image may include asset tag barcodes. The automated rack imaging system may also include a wireless communication component configured to send asset location information and asset tag barcode information received by the image processor to a remote computer. The propulsion system may include a plurality of wheels rotatably mounted to the housing, a driving element configured to rotate the wheels, a steering system configured to pivot the wheels and navigate the housing along predetermined paths, and a processor configured to control the motor and the steering system.

Another aspect of the disclosure provides a method of imaging a datacenter rack with an automated guided vehicle. The method may include moving the automated guided vehicle to a first target location aligned with the datacenter rack. The method may also include taking a plurality of images of the datacenter rack with an imaging system coupled to a housing of the automated guided vehicle. The imaging system may include a plurality of cameras. The cameras each may be configured to have a respective field of view. The fields of view may be at least partially non-overlapping with one another. The method may also include combining the plurality of images taken by the cameras into a single mosaic image using an image processor.

The cameras may be arranged in an array extending in a horizontal direction. The array may be moveable relative to the housing in a vertical direction perpendicular to the horizontal direction. The cameras in the array may be equally spaced apart from one another in the horizontal direction. The taking of the plurality of images may include taking a first set of the images at a first vertical position, moving the array relative to the housing from the first vertical position to a second vertical position spaced apart from the first vertical position in the vertical direction, and taking a second set of the images at the second vertical position.

The imaging system may include a fixture affixed to the housing. The fixture may have a rail extending in the vertical direction and a carriage extending in the horizontal direction. The cameras may be affixed to the carriage. The moving of the array may include moving the carriage along the rail from the first vertical position to the second vertical position. The moving of the carriage along the rail may be driven by a servo motor coupled to the carriage. The plurality of images may be images of portions of the datacenter rack. The method may also include the image processor parsing the single mosaic image to extract asset location information and asset tag barcode information from the single mosaic image. The method may also include wirelessly sending the asset location information and the asset tag barcode information parsed from the single mosaic image to a remote computer.

The moving of the automated guided vehicle to the first target location may include moving the automated guided vehicle in the horizontal direction. The fields of view may extend from the plurality of cameras in a depth direction perpendicular to both the horizontal direction and the vertical direction. The datacenter rack may be a first datacenter rack, the plurality of images may be a first plurality of images, and the single mosaic image may be a first single mosaic image. The method may also include moving the automated guided vehicle from the first target location to a second target location aligned with a second datacenter rack. The method may also include taking a second plurality of images of the datacenter rack with the imaging system. The method may also include combining the second plurality of images taken by the cameras into a second single mosaic image using the image processor. Moving of the automated guided vehicle to the first target location may be performed by a propulsion system rotating a plurality of wheels that are mounted to the housing and by a steering system that pivots the wheels and navigates the housing along predetermined paths.

DETAILED DESCRIPTION

The technology relates generally to automated rack imaging systems and methods of imaging a datacenter rack with an automated guided vehicle (AGV), using an imaging system comprising a plurality of cameras and an image process configured to combine a plurality of images into a single mosaic image. In particular, the automated rack imaging system may be configured to take a plurality of high resolution images of a datacenter rack, and the system may parse location and barcode data from the combined mosaic image, thereby providing accurate current location and data information of the contents of the datacenter rack in an automated fashion. The automated rack imaging system may also provide real-time inventory location and data for commercial and retail racks of products that may not otherwise be obtained in an automated fashion.

Figure 1A:
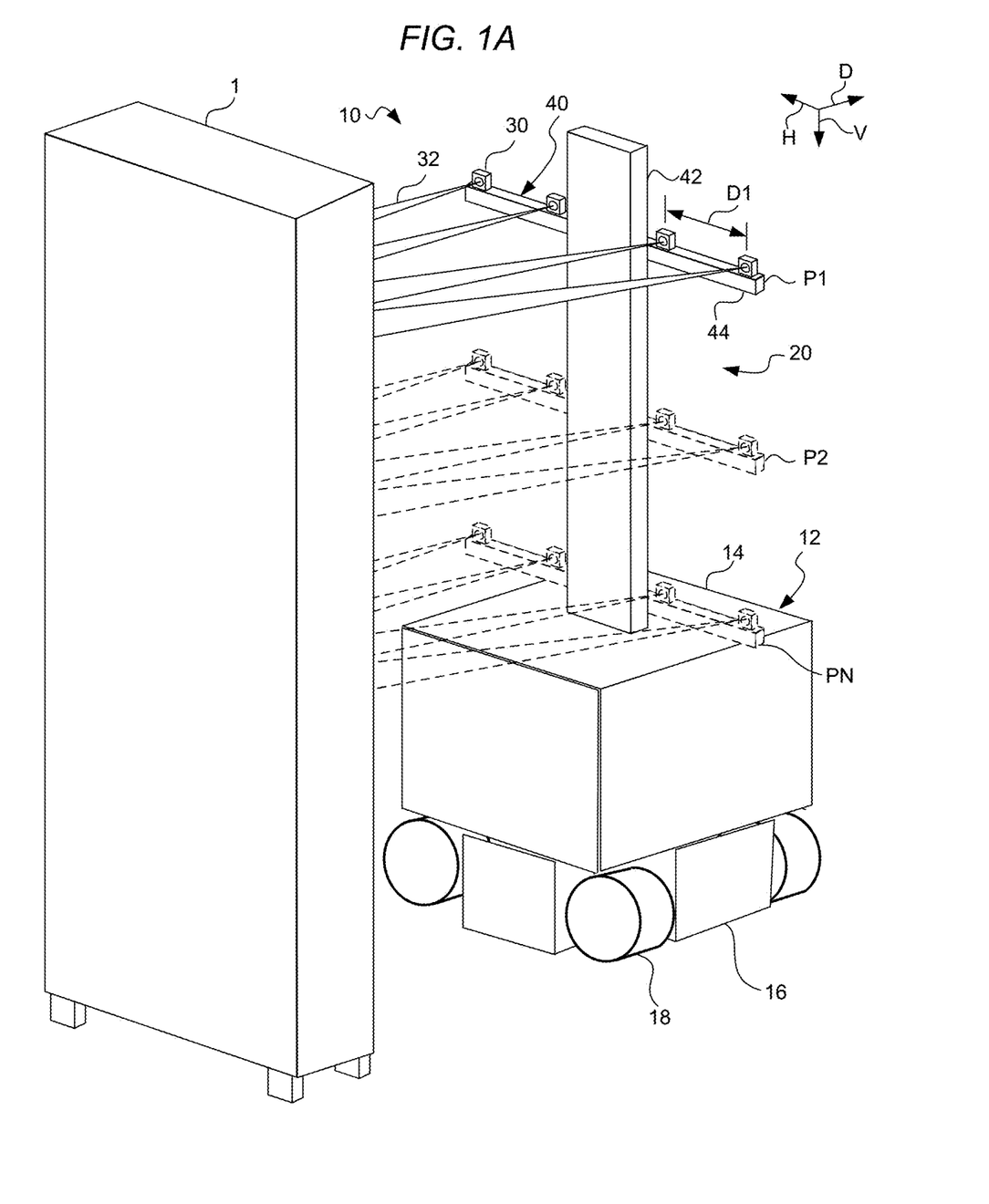
FIG. 1A is a perspective view of an automated rack imaging system.
Figure 1B:
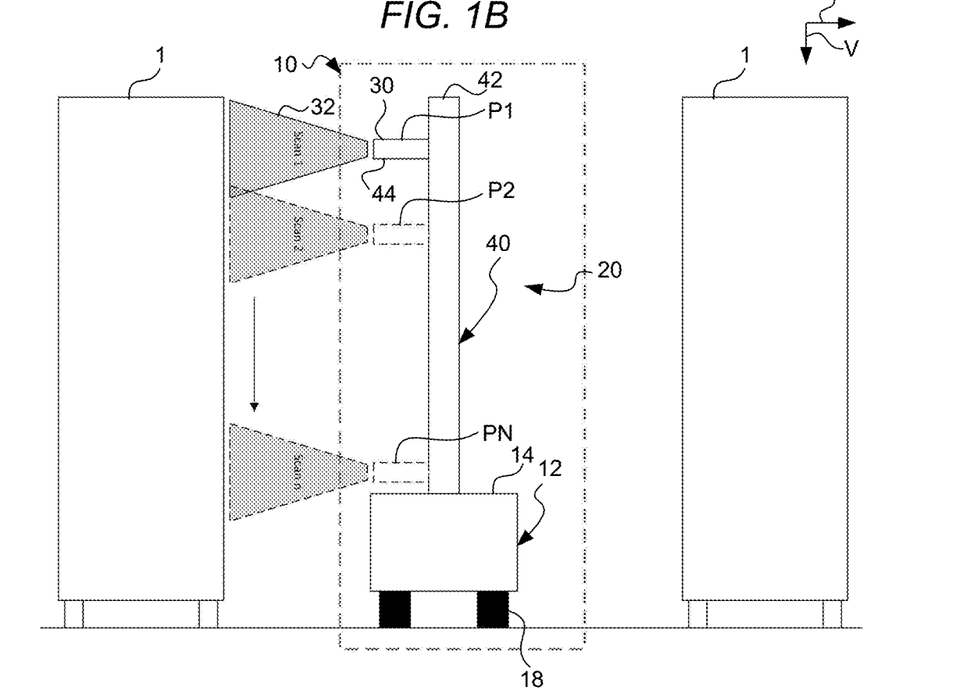
FIG. 1B is a side view of the automated rack imaging system of FIG. 1A.
Figure 1C:
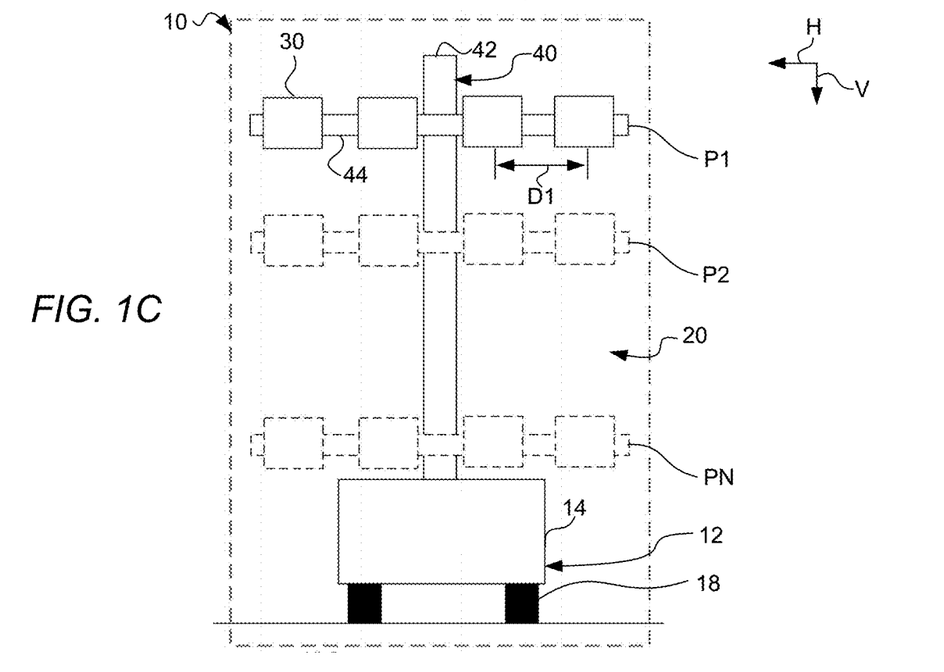
FIG. 1C is a front view of the automated rack imaging system of FIG. 1A.

Referring to FIGS. 1A through 1C, an automated rack imaging system 10 for imaging a datacenter rack 1 may include an AGV 12 having a housing 14 and a propulsion system 16 configured to move the housing. The housing 14 is generally in the shape of a rectangular prism, but in other examples, the housing may have any other shape, such as a square prism, a cylinder, or the like. The propulsion system 16 may include a motor or another driving element (not shown) that is configured to rotate a plurality of wheels 18 that are rotatably mounted to the housing 14, a steering system (not shown) that is configured to pivot the wheels and navigate the AGV 12 along predetermined paths, and a processor or control system 100 (to be described below in FIG. 3) that is configured to control the motor and the steering system. The AGV 12 may also include sensors (not shown) for detecting where the AGV should be navigated. The example configuration of the AGV 12 that is shown in FIGS. 1A through 1C is merely one possible example of a flexible mobile robotics platform. In other examples, there may be many other configurations of components for moving the AGV 12 from one location to another.

The automated rack imaging system 10 may also include an imaging system 20 coupled to the housing 14. The imaging system 20 may include a plurality of cameras 30. The cameras 30 each may be configured to have a respective field of view 32. The fields of view 32 may be at least partially non-overlapping with one another, although in some examples, the fields of view may be entirely non-overlapping with one another. The fields of view 32 of the cameras 30 may extend away from the cameras in a depth direction D between the datacenter rack 1 and the cameras. The automated rack imaging system 10 may include an image processor (not shown) configured to combine a plurality of images taken by the cameras 32 into a single mosaic image. Examples of the plurality of images and the single mosaic image will be shown and described below with respect to FIGS. 2A and 2B.

The imaging system 20 may include a fixture 40 affixed to the housing, the fixture having a rail 42 extending in a vertical direction V perpendicular to the depth direction D, and a carriage 44 extending in a horizontal direction H perpendicular to the vertical direction and the depth direction. The cameras 30 may be affixed to the carriage 44. The cameras 30 may be arranged along the carriage 44 in an array extending in the horizontal direction H. The cameras 30 in the array may be equally spaced apart from one another by a distance D1 in the horizontal direction. The carriage 44 may be coupled to the rail 42 such that the carriage and the array of cameras 30 affixed thereto are moveable relative to the rail in the vertical direction V. The imaging system 20 may include a servo motor (not shown) configured to move the carriage 44 in the vertical direction D along the rail 42.

The carriage 44 is moveable in the vertical direction V to any position along the rail 42. First, second, and Nth vertical positions P1, P2, and PN of the carriage 44 are shown in FIG. 1A, which are spaced apart from one another in the vertical direction V. As can be seen in FIG. 1B, the cameras 30 can each take a separate image scan when the carriage 44 is in each position along the vertical direction V. Each camera 30 may take any number "N" of image scans that is needed in order to form a complete mosaic image of the contents of the datacenter rack 1 when the images are combined by the image processor. As shown in FIG. 1B, the carriage 44 may start in the first vertical position P1 and may be moved downwards in the vertical direction V, and each camera may record a plurality an image scans at each vertical position as the carriage continues to move downwards, until the carriage reaches an end of its travel range at the Nth vertical position PN. It should be understood that the imaging system 20 is one example of an imaging system, and that in other examples, any of a variety of other implementations of a system that can carry and move the cameras 30 to scan images of the datacenter rack 1 may be used.

Figure 2A:
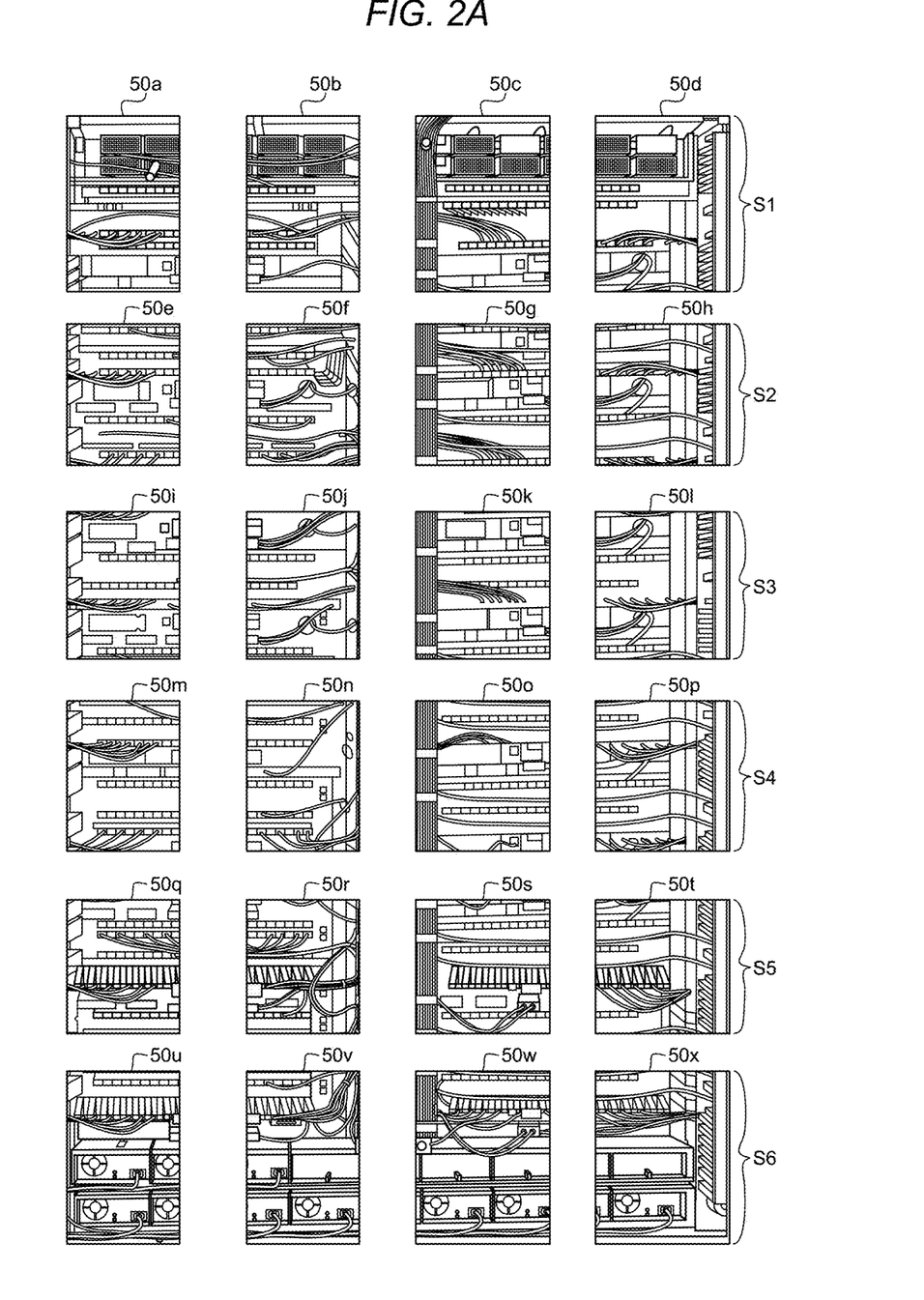
FIG. 2A is an example array of rack images that may be captured by the automated rack imaging system of FIG. 1A.
Figure 2B:
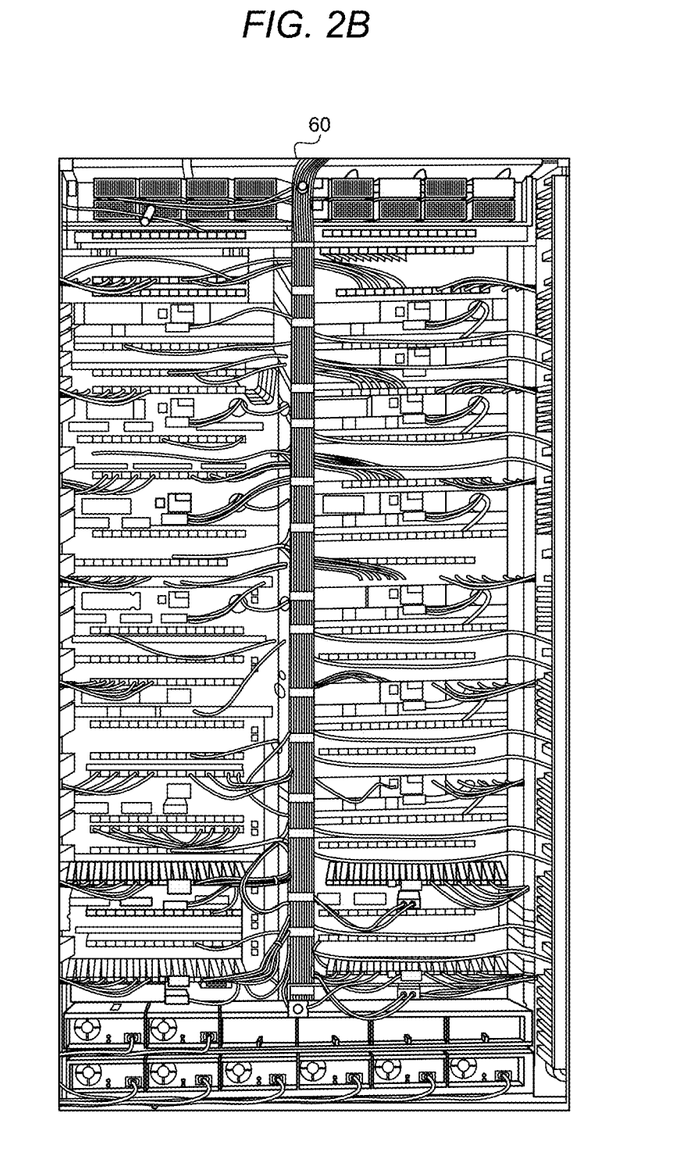
FIG. 2B is a single mosaic image combining the array of rack images of FIG. 2A.

FIGS. 2A and 2B illustrate examples of the plurality of images 50a through 50x (collectively, the images 50) that are taken by the camera 30 during an image scan process and the single mosaic image 60 that is created by the image processor from the images 50. In the example shown, the images 50 are arranged in a four-by-six grid, with six rows of four images each extending in the horizontal direction H. As shown in FIG. 2A, the four cameras 30 shown in FIGS. 1A through 1C each have taken six image scans, each set of scans S1 through S6 being represented by a different horizontal row in the figure. Each of the image scans S1 through S6 was taken at a different vertical position along the carriage 44, such as P1 through PN, where N=6. Therefore, the plurality of images 50 includes a first set Si of the images taken at a first vertical position P1 that includes the images 50a-50d, a second set S2 of the images taken at a second vertical position P2 that includes the images 50e-50h, through to an Nth set of the images (S6 in this example) taken at an Nth vertical position PN that includes the images 50u-50x. The first vertical position P1, the second vertical position P2, and the Nth vertical position PN of the carriage 44 are spaced apart from one another in the vertical direction V.

In the example shown in FIGS. 2A and 2B, the plurality of images 50 are images of portions of the datacenter rack 1. The images 50a through 50x taken by the cameras 30 in the positions P1 through PN may be combined into the single mosaic image 60 using an image processor. Once the single mosaic image 60 is created, the image processor may parse the single mosaic image to extract asset location information and asset tag barcode information. Once the asset location information and asset tag barcode information is extracted, a wireless communication component (e.g., component 115 of FIG. 3) may send this information to a remote computer.

In order to make a full single mosaic image 60 with no horizontal or vertical gaps, there may be a small amount of overlap between the field of view recorded in adjacent ones of the images 50. However, in other examples, there may be no overlap between the field of view recorded in adjacent ones of the images 50, since a complete imaging of the datacenter rack 1 may not be necessary to identify the specific components or types of components and their locations within the datacenter rack, or to parse the single mosaic image to extract asset location information and asset tag barcode information.

Figure 3:
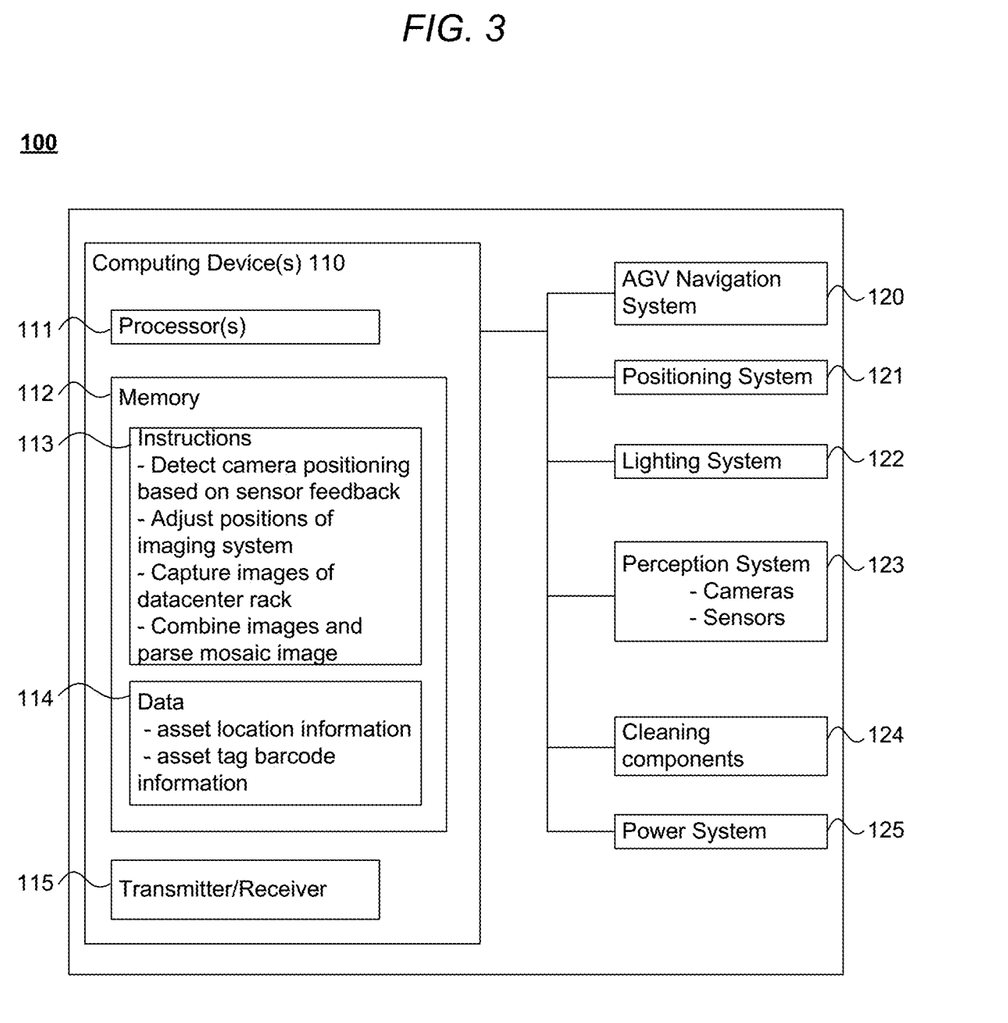
FIG. 3 is a diagrammatic view of a control system that may be used to control the automated rack imaging system of FIG. 1A.

Referring to FIG. 3, an example control system 100 is illustrated. As shown, the control system 100 includes one or more computing devices 110 coupled to various components 120-125, such as AGV navigation system 120, positioning system 121, lighting 122, perception system 123, cleaning components 124, and power system 125. The computing device 110 further includes one or more processors 111, memory 112, and other components typically present in microprocessors, general purpose computers, or the like.

The one or more processors 111 may be any conventional processors, such as commercially available microprocessors. Alternatively, the one or more processors may be a dedicated device such as an application specific integrated circuit (ASIC) or other hardware-based processor. In some examples, the one or more processors may include a graphics processing unit (GPU) and/or a tensor processing unit (TPU), for example, for machine-learning based perception. Although FIG. 3 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of computing device 110. Accordingly, references to a processor or computing device will be understood to include references to a collection of processors or computing devices or memories that may or may not operate in parallel.

Memory 112 may store information that is accessible by the processors 111, including instructions 113 that may be executed by the processors, and data 114 such as asset location information and/or asset tag barcode information. Such instructions 113 may include detecting camera positioning based on sensor feedback, adjusting positions of the imaging system, capturing images of the datacenter rack, and combining images and parsing the mosaic image. The memory 112 may be of a type of memory operative to store information accessible by the processors 111, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions 113 and data 114 are stored on different types of media.

Data 114 may be retrieved, stored or modified by processors 111 in accordance with the instructions 113. For instance, although the present disclosure is not limited by a particular data structure, the data 114 may be stored in computer registers, in a relational database as a table having a plurality of different fields and records, XML documents, or flat files. The data 114 may also be formatted in a computer-readable format such as, but not limited to, binary values, ASCII or Unicode. By further way of example only, the data 114 may be stored as bitmaps comprised of pixels that are stored in compressed or uncompressed, or various image formats (e.g., JPEG), vector-based formats (e.g., SVG) or computer instructions for drawing graphics. Moreover, the data 114 may comprise information sufficient to identify the relevant information, such as numbers, descriptive text, proprietary codes, pointers, references to data stored in other memories (including other network locations) or information that is used by a function to calculate the relevant data.

In one example, computing device 110 may be an AGV computing system incorporated into control system 100, such as an AGV 12 having an imaging system 20. The computing device may capable of communicating with various components of the system autonomously, or without continuous input from a human operator. For example, computing device 110 may be in communication with various components 120-125 of the control system 100, which operate in accordance with the instructions 113 of memory 112 in an autonomous mode which does not require or need continuous or periodic input from an operator. Although these systems are shown as external to computing device 110, in other examples these systems may also be incorporated into the computing device.

The instructions 113 may be executed to perform various operations using one or more of the components 120-125 or other components not shown. For example, the AGV navigation system 120 may include a GPS or other system which directs the AGV to a target datacenter rack 1 for imaging. The positioning system 121 may be instructed to respond to feedback provided by the perception system 123, which may include one or more cameras, sensors, etc. For example, the positioning system 121 may include one or more motors or other devices used to control positioning of the AGV 12 and/or cameras 30. As the perception system 123 provides data regarding proximity of the target datacenter rack 1 to the cameras 30, the positioning system 121 may adjust a position of one or more of the AGV 12 or carriage 44 so as to maintain a position where the cameras are in close proximity to the target location.

Lighting system 122 may include one or more LEDs or other illuminating devices. The lighting system 122 may be instructed to illuminate a target location for imaging of a datacenter rack 1 any time the AGV 12 is within a predetermined distance from the target location, when environmental conditions are such that natural light is insufficient, or under any other circumstances. In this regard, the lighting system 122 may also be responsive to input from the perception system 123, such as feedback from light or proximity sensors. Similarly, cleaning components 124 may also respond to feedback from the perception system 123. For example, the one or more processors 111 may determine, based on images captured by the perception system 123, that the target location is dirty. As such dirt may be obstructing information, such as an asset tag barcode that needs to be read to determine which component is in a particular datacenter rack 1, the cleaning components 124 may be instructed to spray air or perform some other operation to clear the debris. The power system 125 may include, for example, a battery for powering the control system 100.

While the components 110-115 and 120-125 are described above in reference to an example of a datacenter rack imaging mode, it should be understood that the components may also operate in response to operator input or other instructions. For example, the computing device 110 may provide information to a remote computing device, such as an operator control unit, through transmitter/receiver 115. Likewise, the computing device 110 may receive instructions from the remote operator control unit. In other examples, the control system 100 may operate in an autonomous datacenter rack imaging mode, but still provide feedback to a remote computing device using the transmitter/receiver 115.

The design of the automated rack imaging system 10 shown in FIGS. 1A-3 is just one example of the automated rack imaging system. Many other configurations of the automated rack imaging system 10 are contemplated, including imaging systems 20 having different numbers of cameras 30, rails 42 and carriages 44 with different widths and/or heights, and AGVs 12 of various designs. In some configurations, the imaging system 20 may have a more or less than four cameras 30, such as 2, 3, 5, 6, 8, or 10, among others. In some examples, image scans may be taken with the carriage 44 at more or less than six different vertical positions, such as 2, 3, 4, 5, 8, 10, 15, or 20, among others.

The automated rack imaging system 10 may also be used in environments other than datacenters. For example, the automated rack imaging system 10 may be used for manufacturing or retail inventory tracking. For example, the imaging system 20 may scan barcodes of products on a rack in a warehouse in the images 50 and in the single mosaic image 60, and such barcodes can be parsed from the single mosaic image by the image processor. In some examples, the imaging system 20 may scan any two-dimensional space, and information may be parsed from the single mosaic image 60 to provide inventory information either based on parsing barcodes from the single mosaic image or based on the shape and arrangement of the individual inventory items.

Figure 4:
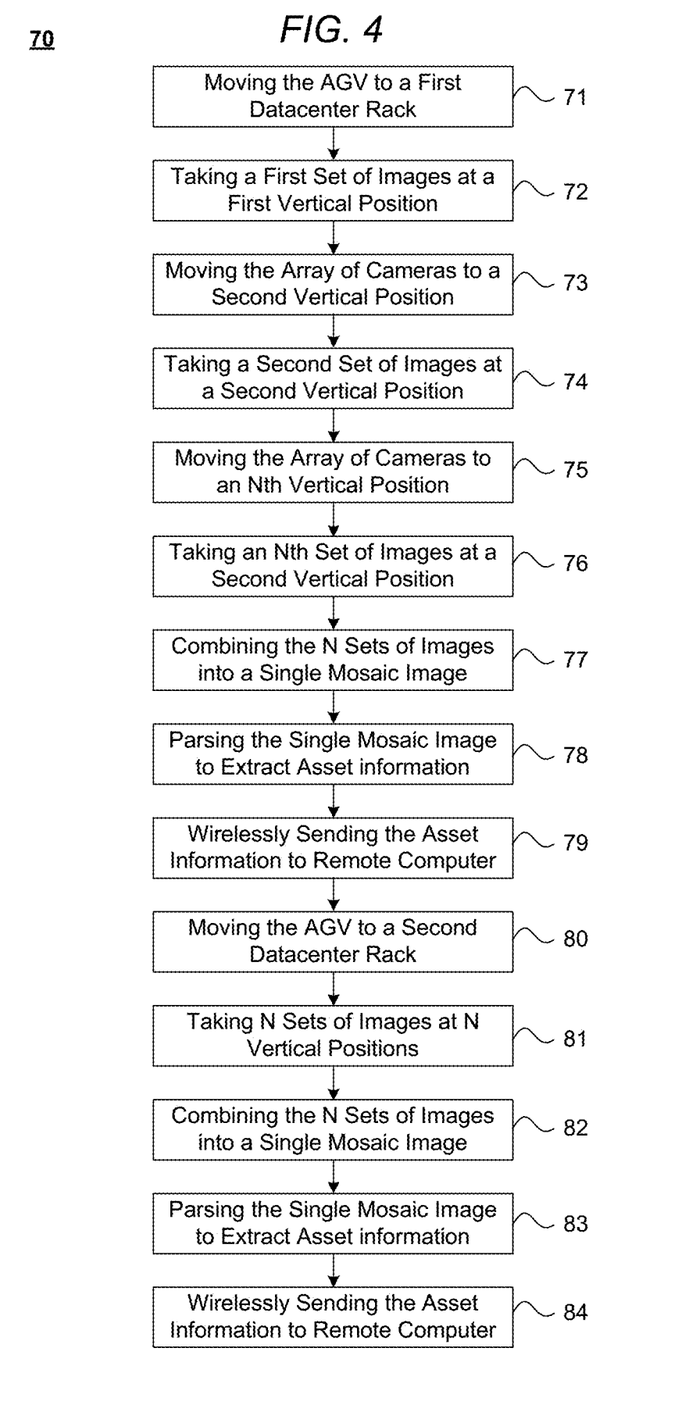
FIG. 4 is a flow diagram of a method using the automated rack imaging system of FIG. 1A to determine the state of datacenter rack contents.

Referring to FIG. 4, a method of imaging a datacenter rack with an automated guided vehicle will now be described in a flow diagram 70. In step 71, the AGV 12 may move to a first target location aligned with a first datacenter rack 1. This step may be performed by the AGV navigation system 120 controlling the propulsion system 16. The AGV navigation system 120 may be controlled by the computing device 110 and/or a human operator that is remote from the AGV 12.

In step 72, the array of cameras 30 may take a first set of images of the first datacenter rack with the cameras and the carriage 44 being located at the first vertical position P1.

In step 73, the array of cameras 30 and the carriage 44 may move relative to the housing 14 from the first vertical position P1 to a second vertical position P2 spaced apart from the first vertical position in the vertical direction V. The moving of the carriage 44 along the rail 42 may be driven by a servo motor coupled to the carriage. In step 74, the array of cameras 30 may take a second set of images of the first datacenter rack with the cameras and the carriage 44 being located at the second vertical position P2.

In step 75, the array of cameras 30 and the carriage 44 may move relative to the housing 14 from the second vertical position P2 to an Nth vertical position PN spaced apart from the second vertical position in the vertical direction V. In step 76, the array of cameras 30 may take an Nth set of images of the first datacenter rack with the cameras and the carriage 44 being located at the Nth vertical position PN. Steps 75 and 76 may be repeated until all N sets of images are taken. Each of the images may be a respective portion of the first datacenter rack 1.

In step 77, the N sets of images may be combined into a first single mosaic image of the first datacenter rack 1 using an image processor. In step 78, the image processor may parse the first single mosaic image to extract asset location information and asset tag barcode information from the first single mosaic image. In step 79, the transmitter 115 may wirelessly send the asset location information and the asset tag barcode information parsed from the first single mosaic image to a computer that is remote from the AGV 12.

In step 80, the AGV 12 may move to a second target location aligned with a second datacenter rack 1. The AGV 12 may be travel along a predetermined path in an aisle between adjacent datacenter racks 1. This step may be performed by the AGV navigation system 120 controlling the propulsion system 16. The AGV navigation system 120 may be controlled by the computing device 110 and/or a human operator that is remote from the AGV 12.

In step 81, the array of cameras 30 and the carriage 44 may move relative to the housing 14 to N vertical positions in the vertical direction V, and the array of cameras 30 may take N sets of images of the second datacenter rack 1 with the cameras and the carriage 44 being located at the N different vertical positions. Each of the images may be a respective portion of the second datacenter rack 1.

In step 82, the N sets of images may be combined into a second single mosaic image of the second datacenter rack 1 using an image processor. In step 83, the image processor may parse the second single mosaic image to extract asset location information and asset tag barcode information from the first single mosaic image. In step 84, the transmitter 115 may wirelessly send the asset location information and the asset tag barcode information parsed from the second single mosaic image to a computer that is remote from the AGV 12. Steps 80-84 may be repeated for any number of datacenter racks 1.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

The invention claimed is:

1. An automated rack imaging system, comprising:
   an automated guided vehicle having a housing and a propulsion system configured to move the housing;

an imaging system coupled to the housing, the imaging system including a plurality of cameras, the cameras each being configured to have a respective field of view, the fields of view being at least partially non-overlapping with one another;

an image processor configured to combine a plurality of images taken by the cameras into a single mosaic image;

a rail extending in a vertical direction affixed to the housing; and a carriage extending in a horizontal direction coupled to the rail, wherein the cameras are arranged along the carriage in an array extending in the horizontal direction, such that the carriage and the array are moveable relative to the rail and the housing in the vertical direction to assume one of a plurality of positions along the rail.

2. The automated rack imaging system of claim 1, wherein the cameras in the array are equally spaced apart from one another in the horizontal direction.

3. The automated rack imaging system of claim 1, wherein the plurality of images includes a first set of the images taken at a first vertical position and a second set of the images taken at a second vertical position, the first vertical position and the second vertical position being spaced apart from one another in the vertical direction.

4. The automated rack imaging system of claim 1, wherein the imaging system includes a servo motor configured to move the carriage in the vertical direction along the rail.

5. The automated rack imaging system of claim 1, wherein the plurality of images are images of portions of a datacenter rack, and the single mosaic image includes asset tag barcodes.

6. The automated rack imaging system of claim 1, further comprising a wireless communication component configured to send asset location information and asset tag barcode information received by the image processor to a remote computer.

7. The automated rack imaging system of claim 1, wherein the propulsion system includes a plurality of wheels rotatably mounted to the housing, a driving element configured to rotate the wheels, a steering system configured to pivot the wheels and navigate the housing along predetermined paths, and a processor configured to control a motor and the steering system.

8. A method of imaging a datacenter rack with an automated guided vehicle, the method comprising:

moving the automated guided vehicle to a first target location aligned with the datacenter rack, the automated guided vehicle comprising a housing, a rail extending in a vertical direction affixed to the housing, a carriage extending in a horizontal direction coupled to the rail;

taking a plurality of images of the datacenter rack with an imaging system coupled to the housing of the automated guided vehicle, the imaging system including a plurality of cameras, the cameras each being configured to have a respective field of view, the fields of view being at least partially non-overlapping with one another; and combining the plurality of images taken by the cameras into a single mosaic image using an image processor, wherein the cameras are arranged along the carriage in an array extending in the horizontal direction, such that the carriage and the array are moveable relative to the rail and the housing in the vertical direction to assume one of a plurality of positions along the rail.

9. The method of claim 8, wherein the cameras in the array are equally spaced apart from one another in the horizontal direction.

10. The method of claim 8, wherein taking of the plurality of images includes:

taking a first set of the images at a first vertical position;

moving the array relative to the housing from the first vertical position to a second vertical position spaced apart from the first vertical position in the vertical direction; and taking a second set of the images at the second vertical position.

11. The method of claim 8, wherein the moving of the carriage along the rail is driven by a servo motor coupled to the carriage.

12. The method of claim 8, wherein the plurality of images are images of portions of the datacenter rack, the method further comprising the image processor parsing the single mosaic image to extract asset location information and asset tag barcode information from the single mosaic image.

13. The method of claim 12, further comprising wirelessly sending the asset location information and the asset tag barcode information parsed from the single mosaic image to a remote computer.

14. The method of claim 8, wherein the moving of the automated guided vehicle to the first target location includes moving the automated guided vehicle in the horizontal direction, and the fields of view extend from the plurality of cameras in a depth direction perpendicular to both the horizontal direction and the vertical direction.

15. The method of claim 8, wherein the datacenter rack is a first datacenter rack, the plurality of images is a first plurality of images, and the single mosaic image is a first single mosaic image, the method further comprising:

moving the automated guided vehicle from the first target location to a second target location aligned with a second datacenter rack;

taking a second plurality of images of the datacenter rack with the imaging system; and combining the second plurality of images taken by the cameras into a second single mosaic image using the image processor.

16. The method of claim 8, wherein moving of the automated guided vehicle to the first target location is performed by a propulsion system rotating a plurality of wheels that are mounted to the housing and by a steering system that pivots the wheels and navigates the housing along predetermined paths.

* * * * *